June 12, 1945.                C. D. HETZLER                2,378,297
                              COUPLING DEVICE
                    Filed March 23, 1944        2 Sheets-Sheet 2
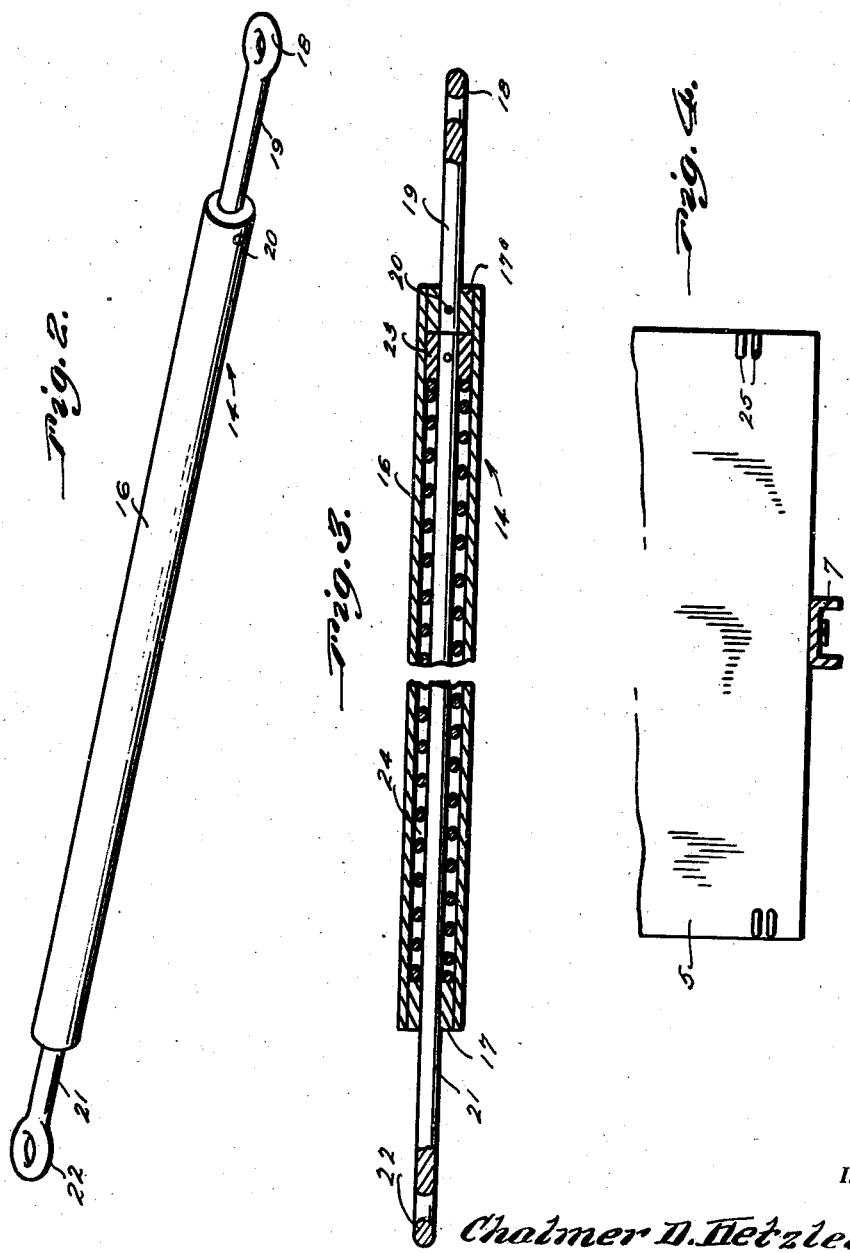
Inventor
Chalmer D. Hetzler,
By Clarence A. O'Brien
and Harvey B. Jacobson
Attorneys Patented June 12, 1945

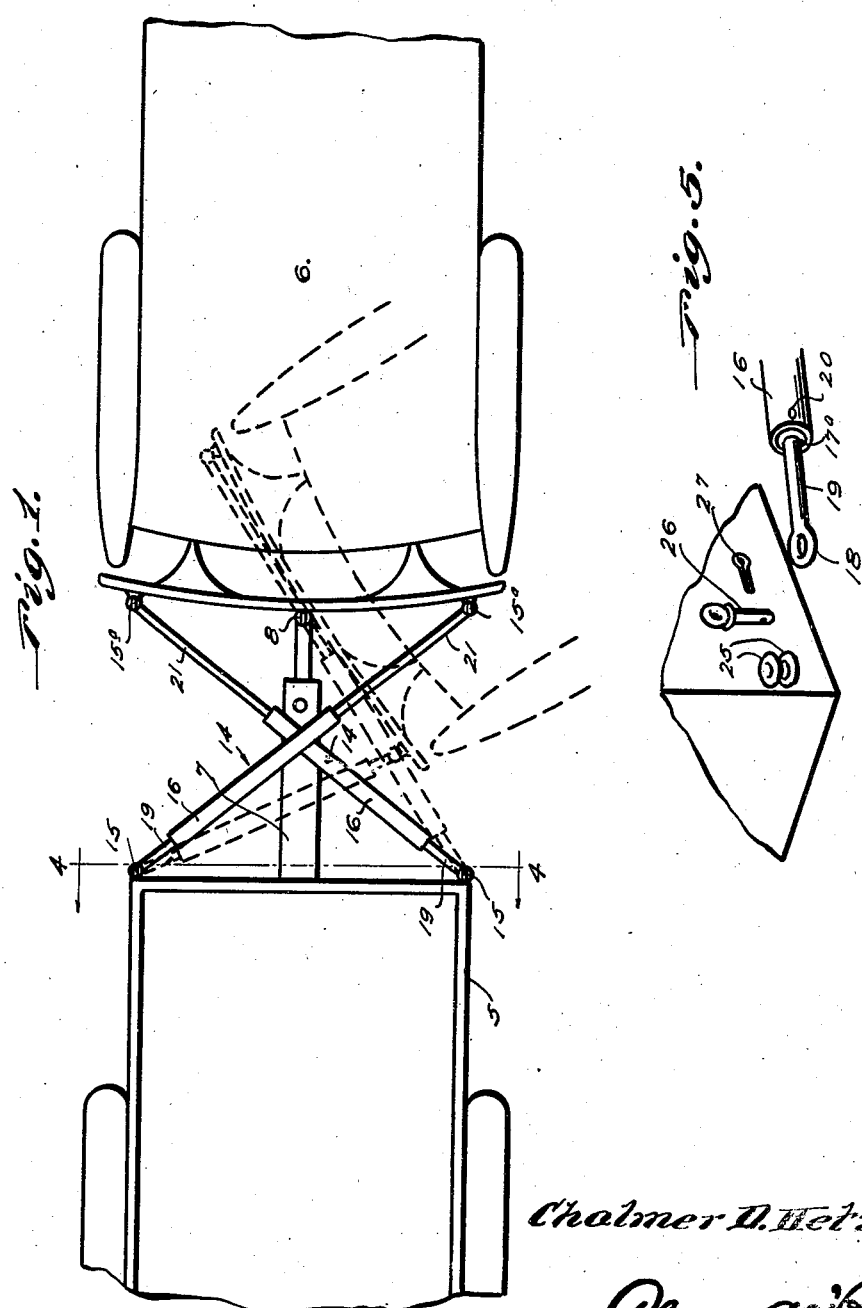

2,378,297

UNITED STATES PATENT OFFICE 2,378,297

COUPLING DEVICE

Chalmer D. Hetzler, Dayton, Ohio

Application March 23, 1944, Serial No. 527,787

2 Claims. (Cl. 280—33.4)

This invention relates to an improved device for coupling a trailer to a towing vehicle, and the primary object of the present invention is to provide such a device which will operate to prevent side sway of the trailer and permit of the turning of the towing vehicle in a short radius.

A further object of the present invention is to provide a simple, strong and safe coupling device of the above kind, which will yield sufficiently under shock and strains incident to sudden starting or jarring, to prevent detrimental effects upon the coupling or the coupled vehicles.

A further object of the invention is to provide a coupling device of the above kind which may be readily installed or removed with respect to the coupled vehicles.

More specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a fragmentary top plan view illustrating a trailer coupled to a towing vehicle by means of a coupling device embodying the present invention.

Figure 2 is an enlarged perspective view of one of the telescopic elastic coupling bars forming part of the coupling device shown in Figure 1.

Figure 3 is a central longitudinal sectional view of the coupling bar shown in Figure 2, partly broken away.

Figure 4 is an enlarged fragmentary transverse vertical section taken on the plane of line 4—4 of Figure 1, with the coupling bars omitted.

Figure 5 is a developed perspective view of the means for pivotally connecting the coupling bars to the coupled vehicles, the parts of said means being disconnected.

Referring in detail to the drawings, 5 indicates a trailer which is hitched to a towing vehicle 6 by means of a conventional draft bar rigid with and centrally projecting forwardly from the trailer 5, said draft bar 7 preferably being adjustable in length and having its forward end pivoted at 8 to the rear end of the towing vehicle 6 centrally between the sides of the latter so that said towing vehicle may freely turn to the right or left relative to the trailer. In practice, it has been found that when a trailer is hitched to a towing vehicle in the manner thus far described, the trailer will often sway from one side to the other and cause serious accidents. The present invention contemplates the provision of a supplemental coupling device between the trailer and the towing vehicle whereby this side sway of the trailer is effectively prevented so that the trailer may be safely towed and so that sudden shocks and strains incident to sudden starting or jarring of the vehicles will be effectively absorbed. This coupling device comprises two crossed similar coupling bars 14 each having one end pivotally connected at 15 to the front end of the trailer 5 at one side of the latter and the other end pivotally connected at 15a to the rear end of the towing vehicle 6 at the opposite side of the latter. Also, each coupling bar 14 consists of a telescopic elastic tension device preferably constructed as specifically shown in Figures 2 and 3, wherein an elongated cylinder 16 has plugs 17 and 17a welded or otherwise fixed in the opposite ends thereof, an eye member 18 having a shank 19 having its free end fitted and secured in the plug 17a, as at 20. Slidable through the plug 17 is an elongated rod 21 having an eye member 22 at its outer end. A cylindrical collar 23 is fitted and secured on the inner end of rod 21 and slidably fitted in the cylinder 16, and disposed within the cylinder 16 in surrounding relation to the rod 21 is a helical compression spring 24 which bears at one end against the plug 17 and at the other end against the collar 23. The pivotal connections 15 and 15a are effected by providing the trailer and the towing vehicle with spaced eye members 25 to receive the eye member 18 or 22 therebetween, a pivot pin 26 being passed through the registered eyes 25 and 18 or 22 and being held in place by a cotter pin 27. Thus, the coupling bars are mounted or pivotally connected to the vehicles for horizontal swinging movement relative thereto. Under normal conditions, when the vehicles are traveling in a straight path, the load of the trailer will cause partial extension of the coupling bars so that their springs 24 are partially compressed, sudden starting or jars being yieldingly absorbed by the springs 24 of the coupling bars. However, when either vehicle is subjected to sudden shock or when the towing vehicle deviates from a straight line of travel, the elastic coupling bars will effectively brace the trailer against side sway. At the same time, the towing vehicle may turn in a short radius as the coupling device permits the towing vehicle to assume a position nearly at right angles to the trailer, as indicated by dotted lines in Figure 1. It will be seen that the invention provides a coupling device of the nature described, which is simple, strong and adapted to be quickly applied or removed with respect to the coupled vehicles. By means of the present invention, side sway of the trailer is effectively prevented so that it may be safely towed under existing road conditions. Minor changes in details of construction illustrated and described are contemplated, such as fall within the spirit and scope of the invention as claimed.

What I claim is:

1. In combination with a towing vehicle and a trailer, and a central longitudinal draft bar rigid with the trailer and centrally pivoted to the rear of the towing vehicle for hitching the trailer to the towing vehicle so that the latter may freely turn to the right or left relative to the trailer, a coupling device for preventing side sway of the trailer relative to the towing vehicle, said coupling device comprising similar crossed longitudinally extensible and collapsible coupling bars, each coupling bar being pivotally connected at one end and on a vertical axis to the front of the trailer at one side of the latter and at the other end to the rear of the towing vehicle at the opposite side of the latter, each coupling bar embodying a telescopic elastic tension device.

2. In combination with a towing vehicle and a trailer, and a central longitudinal draft bar rigid with the trailer and centrally pivoted to the rear of the towing vehicle for hitching the trailer to the towing vehicle so that the latter may freely turn to the right or left relative to the trailer, a coupling device for preventing side sway of the trailer relative to the towing vehicle, said coupling device comprising similar crossed longitudinally extensible and collapsible coupling bars, each coupling bar being pivotally connected at one end and on a vertical axis to the front of the trailer at one side of the latter and at the other end to the rear of the towing vehicle at the opposite side of the latter, each coupling bar embodying a telescopic elastic tension device consisting of a cylinder having a pivot eye member rigid with one end thereof, a rod slidable in and through the other end of the cylinder and having a head on its inner end and a pivot eye member on its outer end, and a helical compression spring in the cylinder yieldingly acting to draw said rod into the cylinder.

CHALMER D. HETZLER.